US009569405B2

(12) United States Patent
Sharifi et al.

(10) Patent No.: US 9,569,405 B2
(45) Date of Patent: Feb. 14, 2017

(54) GENERATING CORRELATION SCORES

(71) Applicant: Google Inc., Mountain View, CA (US)

(72) Inventors: Matthew Sharifi, Palo Alto, CA (US); Dominik Roblek, Mountain View, CA (US)

(73) Assignee: Google Inc., Mountain View, CA (US)

( * ) Notice: Subject to any disclaimer, the term of this patent is extended or adjusted under 35 U.S.C. 154(b) by 316 days.

(21) Appl. No.: 14/265,868

(22) Filed: Apr. 30, 2014

(65) Prior Publication Data
US 2015/0317281 A1 Nov. 5, 2015

(51) Int. Cl.
G06F 17/15 (2006.01)
G06F 17/16 (2006.01)

(52) U.S. Cl.
CPC .............. G06F 17/15 (2013.01); G06F 17/16 (2013.01)

(58) Field of Classification Search
None
See application file for complete search history.

(56) References Cited

U.S. PATENT DOCUMENTS

| 3,831,013 | A | * | 8/1974 | Alsup | G06J 1/005 377/42 |
| 4,255,795 | A | * | 3/1981 | Hechtenberg | G06F 17/15 708/423 |
| 4,864,629 | A | * | 9/1989 | Deering | G06K 9/6203 365/239 |
| 5,901,189 | A | * | 5/1999 | Rose | H04L 7/044 375/343 |
| 6,799,193 | B2 | * | 9/2004 | Kilani | H04L 7/042 708/422 |
| 7,062,440 | B2 | | 6/2006 | Brittan et al. | |
| 7,392,188 | B2 | | 6/2008 | Junkawitsch et al. | |
| 7,492,810 | B2 | * | 2/2009 | Harrison | G01S 19/24 342/352 |
| 7,606,292 | B1 | * | 10/2009 | Harris | H04B 1/709 370/320 |
| 8,145,477 | B2 | * | 3/2012 | Manjunath | G10L 19/097 704/207 |

(Continued)

OTHER PUBLICATIONS

Gough, "Signal processing and correlation techniques," retrieved on Apr. 30, 2014. Retrieved from the internet: URL<http://pollux.dhcp.uia.mx/manuales/Filtros/UIA_correlation.pdf>, 1-15.

(Continued)

Primary Examiner — David H Malzahn
(74) Attorney, Agent, or Firm — Fish & Richardson P.C.

(57) ABSTRACT

A computer-implemented method includes obtaining first and second binary vectors. For each of a plurality of vector locations in a first of j words in the first binary vector, the method includes shifting the binary values for the second binary vector so that a particular one of the binary values in the second binary vector is located at a vector location in a first of the k words in the second binary vector that matches the vector location in the first of j words in the first binary vector. For each of the j words in the first binary vector, the method includes aligning the second binary vector with the word in the first binary vector and determining a binary correlation score. A similarity of the first binary vector and the second binary vector can be determined based at least on one or more of the determined binary correlation scores.

19 Claims, 6 Drawing Sheets

(56) References Cited

U.S. PATENT DOCUMENTS

| | | | |
|---|---|---|---|
| 8,179,949 B2 | 5/2012 | Ko et al. | |
| 8,520,956 B2 | 8/2013 | Bolme et al. | |
| 2010/0146518 A1* | 6/2010 | Freimuth | G06F 17/10 718/105 |
| 2015/0317281 A1* | 11/2015 | Sharifi | G06F 17/15 708/422 |

OTHER PUBLICATIONS

Hale, "An efficient method for computing local cross-correlations of multi-dimensional signals," Center for Wave Phenomena, Consortium Project on Seismic Inverse methods for Complex Structures, CWP-544, May 15-18, 2006, 253-260.

Misra et al., "Efficient Cross-Correlation via Sparse Representation in Sensor Networks," IPSN'12, Apr. 16-20, 2012, 13-24.

Lewis, "Fast Normalized Cross-Correlation," retrieved on Apr. 30, 2014. Retrieved from the internet: URL<http://scribblethink.org/Work/rivisionInterface/nip.html>, 11 pages.

Reuven et al., "Joint noise reduction and acoustic echo cancellation using the transfer-function generalized sidelobe canceller," Speech Communication 49 (2007), 623-635.

'Spotlight' [online] "Dialogue Design Guide," retrieved on Apr. 30, 2014. Retrieved from the internet: URL<http://spotlight.ccir.ed.ac.uk/public_documents/Dialogue_design_guide/barge_in_requirements.htm>, 1 page.

'dspGuru' [online]. "Fast Fourier Transform (FFT) FAQ," retrieved on Apr. 30, 2014. Retrieved from the internet: URL<http://www.dspguru.com/dsp/faqs/fft>, 4 pages.

'Wikipedia' [online]. "Fast Fourier transform," Apr. 25, 2014 [retrieved on Apr. 30, 2014]. Retrieved from the internet: URL<http://en.wikipedia,org/wiki/Fast_Fourier_transform>, 10 pages.

* cited by examiner

FIG. 1A

| | 1st Word | | | | 2nd Word | | | | 3rd Word | | | | 4th Word | | | |
|---|---|---|---|---|---|---|---|---|---|---|---|---|---|---|---|---|
| 102 X: | 1 | 1 | 0 | 0 | 1 | 1 | 1 | 1 | 0 | 1 | 1 | 0 | 0 | 0 | 1 | 0 |
| | 0 | 1 | 2 | 3 | 4 | 5 | 6 | 7 | 8 | 9 | 10 | 11 | 12 | 13 | 14 | 15 |
| 104a Y: | 1 | 0 | 0 | 1 | | | | | | | | | | | | |
| | 0 | 1 | 2 | 3 | 4 | 5 | 6 | 7 | 8 | 9 | 10 | 11 | 12 | 13 | 14 | 15 |

106a:
| Lag: | 0 | 1 | 2 | 3 | 4 | 5 | 6 | 7 |
|---|---|---|---|---|---|---|---|---|
| Corr.: | -4 | | | | | | | |
| Lag: | 8 | 9 | 10 | 11 | 12 | 13 | 14 | 15 |
| Corr.: | | | | | | | | |

FIG. 1B

| | 1st Word | | | | 2nd Word | | | | 3rd Word | | | | 4th Word | | | |
|---|---|---|---|---|---|---|---|---|---|---|---|---|---|---|---|---|
| 102 X: | 1 | 1 | 0 | 0 | 1 | 1 | 1 | 1 | 0 | 1 | 1 | 0 | 0 | 0 | 1 | 0 |
| | 0 | 1 | 2 | 3 | 4 | 5 | 6 | 7 | 8 | 9 | 10 | 11 | 12 | 13 | 14 | 15 |
| 104b Y: | | 1 | 0 | 0 | 1 | | | | | | | | | | | |
| | 0 | 1 | 2 | 3 | 4 | 5 | 6 | 7 | 8 | 9 | 10 | 11 | 12 | 13 | 14 | 15 |

106b:
| Lag: | 0 | 1 | 2 | 3 | 4 | 5 | 6 | 7 |
|---|---|---|---|---|---|---|---|---|
| Corr.: | -4 | 1 | | | | | | |
| Lag: | 8 | 9 | 10 | 11 | 12 | 13 | 14 | 15 |
| Corr.: | | | | | | | | |

FIG. 1C

| | 1st Word | | | | 2nd Word | | | | 3rd Word | | | | 4th Word | | | |
|---|---|---|---|---|---|---|---|---|---|---|---|---|---|---|---|---|
| 102 X: | 1 | 1 | 0 | 0 | 1 | 1 | 1 | 1 | 0 | 1 | 1 | 0 | 0 | 0 | 1 | 0 |
| | 0 | 1 | 2 | 3 | 4 | 5 | 6 | 7 | 8 | 9 | 10 | 11 | 12 | 13 | 14 | 15 |
| 104n Y: | | | | | | | | | | | | | 1 | 0 | 0 | 1 |
| | 0 | 1 | 2 | 3 | 4 | 5 | 6 | 7 | 8 | 9 | 10 | 11 | 12 | 13 | 14 | 15 |

106c:
| Lag: | 0 | 1 | 2 | 3 | 4 | 5 | 6 | 7 |
|---|---|---|---|---|---|---|---|---|
| Corr.: | -4 | 1 | -2 | -3 | 0 | -1 | 4 | 5 |
| Lag: | 8 | 9 | 10 | 11 | 12 | 13 | 14 | 15 |
| Corr.: | 0 | 5 | 8 | 9 | 6 | | | |

GENERATING CORRELATION SCORES

TECHNICAL FIELD

This document generally relates to digital signal processing.

BACKGROUND

Computing devices are increasingly being called upon to perform complex signal processing operations. Some computing devices, such as smartphones, tablet computers, and other mobile devices, are equipped with a range of different sensors that can detect various features from the environments of the computing devices. For example, smartphones may include touch sensors, position sensors, orientation sensors, a camera, and a microphone. Some sensors generate signals that are sampled and digitized so that the signals can be processed by a computer processor. In one example, a microphone coupled to a computing device may include an electrical transducer that converts sound waves to electrical signals. The signals from the microphone transducer may be sampled, and various signal processing operations may be performed on the sampled signal such as filtering and noise suppression. Some signal processing algorithms determine a measure of similarity between multiple signals. One objective of implementing signal processing algorithms is to minimize the computational expense of the algorithm and to minimize latency introduced by the algorithm between detection of a signal and a time when information determined from the signal is made available from an output of the algorithm.

SUMMARY

This document generally describes techniques for determining a measure of similarity between binary vectors. The measure of similarity can be determined based on one or more correlation scores generated for the binary vectors. In some implementations, respective correlation scores can be determined for multiple different lags between a pair of binary vectors of different lengths in a manner that minimizes the number of operations required to generate the respective correlation scores. In some implementations, vectors can be re-aligned for comparison of particular words in the vectors to determine a correlation score without shifting values to different locations in the vectors.

In some implementations, a computer-implemented method includes obtaining a first binary vector of length X and a second binary vector of length Y, the first and second binary vectors each being segmented into words of length n, the first binary vector of length X being longer than the second binary vector of length Y, the first binary vector comprising respective binary values for a plurality of vector locations 0 through X−1, the second binary vector comprising respective binary values for a plurality of vector locations 0 through Y−1. The method can include aligning the second binary vector in a first position with respect to the first binary vector so that each of the binary values in the second binary vector aligns with a respective binary value in the first binary vector. The method can include generating a binary correlation score for the first position of the second binary vector with respect to the first binary vector by performing respective binary operations between each binary value in the second binary vector in the first position and the aligned binary value in the first binary vector. The second binary vector can be aligned in a second position with respect to the first binary vector, without shifting binary values of the second binary vector to different vector locations in the second binary vector, so that each of the binary values in the second binary vector aligns with a respective binary value in the first binary vector, the second position being offset by a multiple of n vector locations from the first position with respect to the first binary vector. A binary correlation score can be generated for the second position of the second binary vector with respect to the first binary vector by performing respective binary operations between each binary value in the second binary vector in the second position and the aligned binary value in the first binary vector. The method can further include determining whether the first binary vector is similar to the second binary vector based at least on one or more of the binary correlation scores.

The second binary vector of length Y can be a multiple of the word length n and each word in the second binary vector can be filled with n binary values.

Aligning the second binary vector in the first position with respect to the first binary vector and generating the binary correlation score for the first position of the second binary vector can include aligning the second binary vector and generating the binary correlation score without shifting binary values of the second binary vector to different vector locations in the second binary vector. Aligning the second binary vector in the second position with respect to the first binary vector and generating the binary correlation score for the second position of the second binary vector can include aligning the second binary vector and generating the binary correlation score without shifting binary values of the second binary vector to different vector locations in the second binary vector.

The first binary vector can be segmented into j words of length n. The second binary vector can be segmented into k words of length n. Aligning the second binary vector in the first position with respect to the first binary vector can include aligning a first of the k words in the second binary vector with a first of the j words in the first binary vector. Aligning the second binary vector in the second position with respect to the first binary vector can include aligning the first of the k words in the second binary vector with a second of the j words in the first binary vector that is different than the first of the j words in the first binary vector.

The method can further include, for each of a plurality of words selected from a group consisting of the j words in the first binary vector other than the first and second of the j words: aligning the second binary vector in a particular position with respect to the first binary vector by aligning the first of the k words in the second binary vector with the respective word among the plurality of words in the first binary vector, and generating a binary correlation score for the particular position of the second binary vector with respect to the first binary vector by performing respective binary operations between each binary value in the second binary vector in the particular position and the aligned binary value in the first binary vector.

The plurality of words selected from the group consisting of the j words in the first binary vector other than the first and second of the j words can include all j−2 words in the first binary vector other than the first and second of the j words.

The method can further include shifting the binary values of the second binary vector by one vector location to generate a first shifted second binary vector in which binary values in the first shifted second binary vector are offset from corresponding binary values in the second binary vector by one vector location. The method can further include, for each of at least some of the words in the first binary vector, aligning a first word of the first shifted second binary vector with the word in the first binary vector and generating a binary correlation score by performing respective binary operations between each binary value in the first shifted second binary vector and a respective aligned binary value in the first binary vector.

The method can further include generating n−2 additional shifted second binary vectors in which, for each m from 2 through n−1, an mth one of the additional shifted second binary vectors has respective binary values that are offset from corresponding binary values in the second binary vector by m vector locations. The method can further include generating binary correlation scores using the additional shifted second binary vectors by aligning each of the additional shifted second binary vectors in one or more positions with respect to the first binary vector and performing binary operations to generate a respective binary correlation score.

The method can further include shifting the binary values of the first binary vector by a first number of vector locations to generate a first shifted first binary vector in which binary values in the first shifted first binary vector are offset from corresponding binary values in the first binary vector by the first number of vector locations, and for each of at least some of the words in the first shifted first binary vector, aligning a first word of the second binary vector with the word in the first shifted first binary vector and generating a binary correlation score by performing respective binary operations between each binary value in the second binary vector and an aligned binary value in the first shifted first binary vector.

The method can further include shifting the binary values of the first binary vector by one vector location at a time for a total of n−1 times, and generating, after each shift of the first binary vector, one or more binary correlation scores based on the shifted first binary vector and the second binary vector.

The method can further include determining a cross-correlation of the first binary vector and the second binary vector based on one or more of the binary correlation scores.

Determining whether the first binary vector is similar to the second binary vector can include determining whether a value of the cross-correlation of the first binary vector and the second binary vector satisfies a threshold cross-correlation value.

The method can further include using one or more of the binary correlation scores to determine whether an audio signal represented by the first binary vector includes an echo of an audio signal represented by the second binary vector.

The binary values in the first binary vector and the second binary vector can each represent changes among consecutive digitized samples in one or more sets of data, wherein the first binary vector and the second binary vector each include binary values from the set {0, 1}, wherein a binary value of 1 can indicate an increase from a first sample value to a next sample value in the one or more sets of data, wherein a binary value of 0 can indicate a decrease from a first sample value to a next sample value in the one or more sets of data.

The first binary vector and the second binary vector can each include binary values from the set {0, 1}. Performing respective binary operations to generate a binary correlation score for the first position or the second position of the second binary vector with respect to the first binary vector can include performing an XOR operation between each binary value in the second binary vector in the first or second position, respectively, and the aligned binary value in the first binary vector.

In some implementations, a computer-implemented method can include obtaining a first binary vector of length X and a second binary vector of length Y, the first binary vector of length X being longer than the second binary vector of length Y, the first binary vector being segmented into j words of length n, the second binary vector being segmented into k words of length n, the first binary vector comprising respective binary values for a plurality of vector locations 0 through X−1, the second binary vector comprising respective binary values for a plurality of vector locations 0 through Y−1. For each of a plurality of vector locations in a first of the j words in the first binary vector, the method can include shifting the binary values for the second binary vector so that a particular one of the binary values in the second binary vector is located at a vector location in a first of the k words in the second binary vector that matches the vector location in the first of the j words in the first binary vector, and for each of the j words in the first binary vector, aligning the second binary vector with the word in the first binary vector and determining a binary correlation score. The method can include determining a similarity of the first binary vector and the second binary vector based at least on one or more of the determined binary correlation scores.

These and other implementations can include one or more of the following features. The plurality of vector locations in the first of the j words in the first binary vector can consist or be comprised of n−1 different vector locations that exclude a first vector location in the first of the j words in the first binary vector. The method can further include identifying that the particular one of the binary values in the second binary vector is located at a vector location in the first of the k words in the second binary vector that matches the first vector location in the first of the j words in the first binary vector, and for each of the j words in the first binary vector and while the particular one of the binary values in the second binary vector is located at the vector location in the first of the k words in the second binary vector that matches the first vector location in the first of the j words in the first binary vector, aligning the second binary vector with the word in the first binary vector and determining a binary correlation score.

The method can further include using one or more of the binary correlation scores to determine whether an audio signal represented by the first binary vector includes an echo of an audio signal represented by the second binary vector.

In some implementations, one or more computer-readable storage devices can include instructions that, when executed by one or more computer processors, cause the one or more computer processors to perform operations. The operations can include obtaining a first binary vector of length X and a second binary vector of length Y, the first binary vector of length X being longer than the second binary vector of length Y, the first binary vector being segmented into j words of length n, the second binary vector being segmented into k words of length n, the first binary vector comprising respective binary values for a plurality of vector locations 0 through X−1, the second binary vector comprising respective binary values for a plurality of vector locations 0 through Y−1. For each of a plurality of vector locations in a first of the j words in the first binary vector, the operations can include shifting the binary values for the second binary vector so that a particular one of the binary values in the second binary vector is located at a vector location in a first of the k words in the second binary vector that matches the vector location in the first of the j words in the first binary vector, and for each of the j words in the first binary vector, aligning the second binary vector with the word in the first binary vector and determining a binary correlation score. A similarity of the first binary vector and the second binary vector can be determined based at least on one or more of the determined binary correlation scores.

These and other implementations can include one or more of the following features. The plurality of vector locations in the first of the j words in the first binary vector can consist or be comprised of n-1 different vector locations that exclude a first vector location in the first of the j words in the first binary vector. The operations can further include identifying that the particular one of the binary values in the second binary vector is located at a vector location in the first of the k words in the second binary vector that matches the first vector location in the first of the j words in the first binary vector, and for each of the j words in the first binary vector and while the particular one of the binary values in the second binary vector is located at the vector location in the first of the k words in the second binary vector that matches the first vector location in the first of the j words in the first binary vector, aligning the second binary vector with the word in the first binary vector and determining a binary correlation score.

BRIEF DESCRIPTION OF THE DRAWINGS

FIGS. 1A-1C are conceptual diagrams that depict a first example process for determining correlation scores for a pair of binary vectors.

FIGS. 2A-2F are conceptual diagrams that depict a second example process for determining correlation scores for the pair of binary vectors.

Like reference numbers and designations in the various drawings indicate like elements.

DETAILED DESCRIPTION

Figure 3:
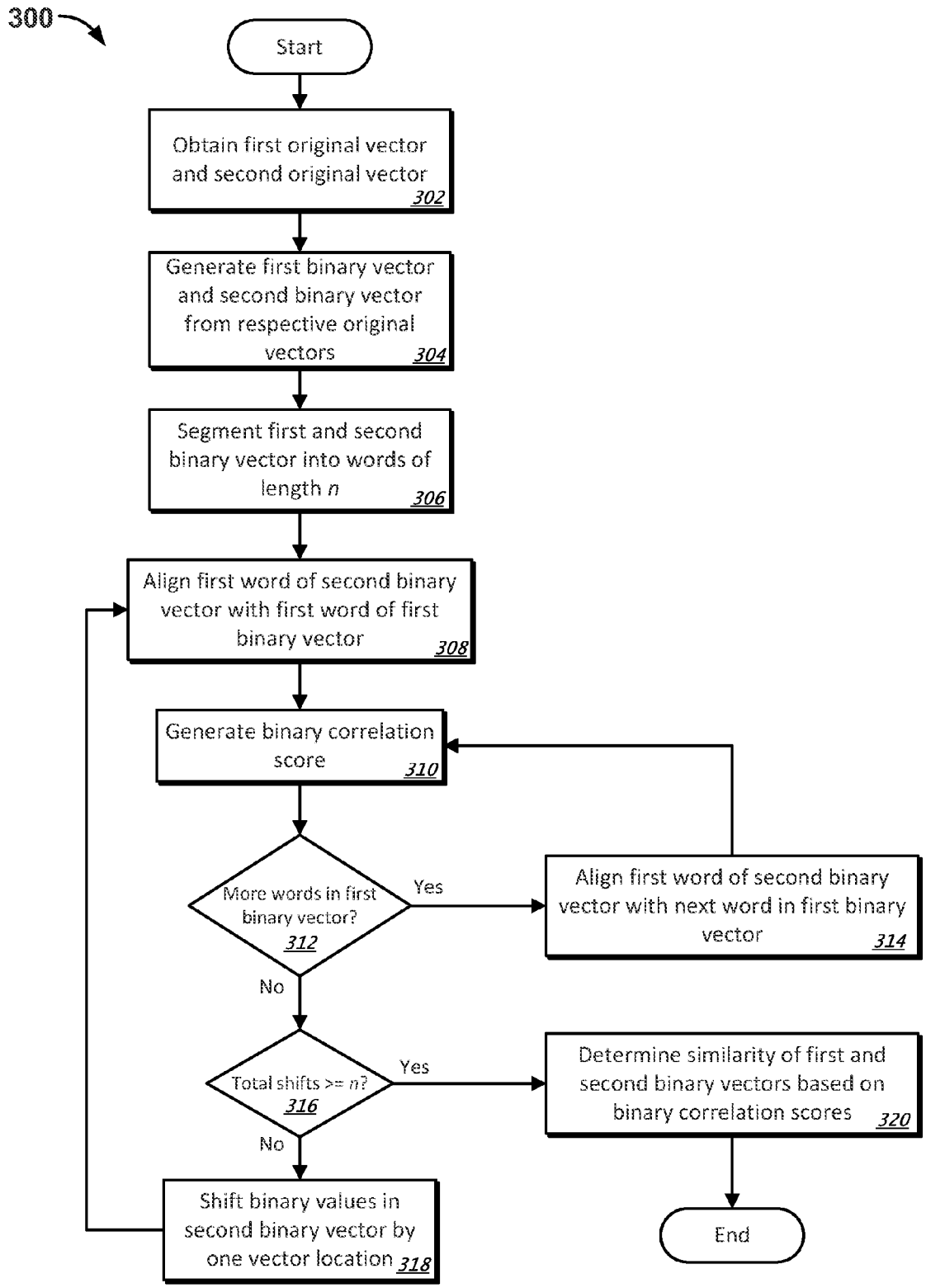
FIG. 3 is a flowchart of the second example process for determining correlation scores for a pair of binary vectors.

This document generally describes techniques for efficiently performing signal processing operations on digital signals. In some implementations, the techniques can be applied to determine a cross-correlation among signals of different lengths, which is a measure of the similarity between signals as a function of the time lag between the signals. Cross-correlation is useful in many different signal processing applications from pattern recognition and image analysis to speech recognition. Some signal processing systems require frequent determination of the cross-correlation between signals. The techniques described herein can be used to reduce the latency and computational expense of determining cross-correlation.

As noted above, the cross-correlation of two signals is a measure of the similarity of the signals as a function of a time-lag applied to one or the other of the pair of signals. Cross-correlation can be determined for both continuous time and discrete time functions. In digital signal processing, the discrete time cross-correlation can be of great importance to determining a relationship between various signals. Cross-correlation can be described in terms of the equation that defines it:

$$(f*g)[n] = \sum_{m=-\infty}^{\infty} f^*[m]g[m+n]$$

The cross-correlation of two discrete sequences f and g for a given lag value n can be determined according to this definition by applying the lag value n to a first one of the sequences, g, so as to align values in the first sequence with values in the second sequence, f, where the alignment of the values depends on the lag value n. Each of the aligned pairs of values of the sequences is then multiplied, and the resulting products of the aligned value pairs are summed to arrive at the cross-correlation of the signals for the lag value n. In implementations where the signals have complex values, the second sequence, f, to which the lag was not applied, is changed to its complex conjugate before the aligned value pairs are multiplied. For all real-valued sequences, this operation of determining the complex conjugate does not apply since the complex conjugate of a real-valued sequence is equivalent to the original real-valued sequence.

One example of determining the cross-correlation of two discrete sequences will be described with reference to the following two sequences, which are expressed in terms of vectors holding respective values for the sequences:

f=[16 54 11 7 25 1]
g=[21 4 8 9 62 19]

The sequences f and g in this example are of the same length, having values in six different vector locations each. In some implementations, the sequences may represent respective portions of longer sequences of values. For example, the sequences may represent digitally sampled values from a pair of audio signals. The audio from one or both of the signals may consist of a relatively long stream of audio, although the sequences for which the cross-correlation is to be determined are relatively short portions of the audio stream. Shorter portions of a longer signal may be used to determine the cross-correlation of the signals at defined intervals of the longer signals. Thus, for example, two streams of audio may be received over a period of several minutes. While the audio streams are received, there may be a need to determine the cross-correlation of the streams at regular intervals, say, every 1, 5, or 30 seconds. At the defined interval, the cross-correlation may be determined between the streams over the period of time since the previous interval. Thus, the sequences f and g may represent sampled audio values over the most recent 1, 5, or 30 second intervals, for example. In some implementations, the sequences may be of different lengths, however. For example, one of the sequences may be a known audio stream, while the other is unknown. Cross-correlation may be determined among the known sequence and a portion of the unknown sequence at regular intervals. The six-value sequences f and g provided in the example above may be considered very short sequences for purposes of explanation. In practice, cross-correlation may be determined from sequences that are thousands or even millions of values long in some implementations. For example, just 1 second of high quality digital audio may include 44,100 sampled values.

The cross-correlation of the sequences f and g can first be determined for a lag value n=0. At lag value 0, the sequences are aligned such that values from the same vector locations in each sequence are aligned. For example, the values in the each of the vectors f and g can be referenced by a unique vector location in the vectors. The convention used in this paper is that for a vector of length l, the vector contains vector locations 0 through l–1. Thus, since vectors f and g are each of length six, the vector locations are 0, 1, 2, 3, 4, and 5 in each of the vectors. The value of vector location $f_0$ is 16, the value of vector location $f_5$ is 1, the value of vector location $g_0$ is 21, and the value of vector location $g_5$ is 19. Accordingly, at lag 0, the values of vector locations $f_0$ and $g_0$ are aligned, $f_1$ and $g_1$ are aligned, and so on. To determine the cross-correlation of the sequences f and g at lag 0, aligned value pairs are multiplied and the products summed to determine the cross-correlation value (score) of the sequences for lag 0. Thus, the aligned values of the sequences yield value pair products 336, 216, 88, 63, 1550, and 19 for the zero through fifth vector locations, respectively. The sum of these products generates a cross-correlation values for the sequences of 2,272 at lag 0.

Similarly, cross-correlation values can be determined for the sequences f and g at different lag values. In some implementations, the cross-correlation of two sequences for a non-zero lag value can be determined by shifting values within one of the sequences to new vector locations by a number of vector locations corresponding to the lag value. In some implementations, the cross-correlation of two sequences for a non-zero lag value can be determined by re-aligning the vectors with respect to each other without shifting values within the vectors. As explained further below, the end result of shifting one of the vectors as compared to aligning without shifting may be equivalent, but the two techniques can expend different levels of computational resources. For example, shifting may require additional computer operations to be performed than aligning without shifting. With either technique, the aligned values or the aligned vector locations are changed from the aligned values or vector locations for lag zero.

Generating a cross-correlation value of two sequences f and g for a lag value n by shifting involves shifting the values in one of the sequences by n vector locations. For example, to determine the cross-correlation of the above sequences f and g at lag n=1, the values in sequence g can be shifted by 1 vector location to generate shifted sequence $g^1$=[0 21 4 8 9 62 19]. In shifted sequence $g^1$, the zero through sixth vector locations are filled with values 0, 21, 4, 8, 9, 62, and 19, respectively. The values have been shifted by one vector location from their locations in original sequence g. The cross-correlation of f and g at lag 1 can be calculated by aligning corresponding vector locations of $g^1$ with f, determining products of each of the aligned value pairs, and determining the sum of the products. For example, the cross-correlation of f and g at lag n=1 can be determined by the aligned values of $g^1$ and f as follows: (16)*(0)+(54) *(21)+(11)*(4)+(7)*(8)+(25)*(9)+(1)*(62)+(0)*(19)=1, 521. Using the shifted sequence $g^1$, the cross-correlation value is determined by adding the products of aligned value pairs assigned to vector locations $f_0*g^1_0$, $f_1*g^1_1$, $f_2*g^1_2$, $f_3*g^1_3$, $f_4*g^1_4$, and $f_5*g^1_5$. In some implementations, vector locations that do not hold an original sequence value, such as $g^1_0$ (vector location 0 in shifted sequence $g^1$) and $f_6$ (vector location 6 in sequence f) can be filled with the zero value.

Cross-correlation values of the sequences f and g at non-zero lags can also be determined by aligning (or re-aligning) without shifting values. Aligning is a process of fixing a first of the sequences at a location relative to the other of the sequences so as to align one or more of the vector locations from the first of the sequences with one or more respective vector locations from the other of the sequences. Unlike shifting, in which values are shifted within one of the vectors to new vector locations, re-aligning does not include generating a shifted vector sequence. Instead, re-aligning a pair of vectors can conceptually be thought of as sliding one vector relative the other by a number of vector locations corresponding to a particular lag value. The effect of re-aligning vectors is that vector locations in one vector are offset from vector locations in the other vector by an amount corresponding to the particular lag value. For example, if two vectors are originally aligned such that vector location 0 in a first vector is aligned with vector location 0 in a second vector, then re-aligning the vectors for determination of the cross-correlation at lag value 2 can involve offsetting one of the vectors from the other by 2 vector locations so that vector location 0 of the first vector is aligned with vector location 2 of the second vector, or vice versa. The re-alignment of vectors is in contrast to shifting values in a vector to new vector locations, in which vector locations between the first and second vectors are not offset from each other (e.g., vector locations 0 in both vectors remain aligned even after values are shifted to new vector locations). Referring again to the example vectors f and g above, these vectors can be re-aligned, for example, to calculate cross-correlation at lag value 2 by aligning vector locations $f_0$, $f_1$, and $f_2$ with vector locations $g_2$, $g_3$, and $g_4$, respectively.

In some implementations, cross-correlation values can be determined using a combination of shifting and re-aligning techniques. For example, the cross correlation of f and g for lag value 2 can be calculated by shifting the values of g by one vector location to generate the shifted $g^1$ sequence [0 21 4 8 9 62 19], and then $g^1$ can be aligned to the f sequence with an offset of 1 so that the vector locations $f_1$, $f_2$, $f_3$, $f_4$, and $f_5$ align with vector locations $g^1_0$, $g^1_1$, $g^1_2$, $g^1_3$, and $g^1_5$, respectively. Thus, the result of either shifting one of the sequences by two vector locations or re-aligning the vectors so that the aligned values are offset by two vector locations among the vectors can also be achieved by the combination of shifting one of the sequences by a single vector location and re-aligning the vectors so that the aligned values are offset by one vector location to determine the cross-correlation for lag value 2.

The cross-correlation of two sequences can be calculated using one or more different algorithms. In some implementations, cross-correlation is calculated directly from the definition of cross-correlation. For example, for each lag value for which a cross-correlation is to be determined, the product of each aligned value pair can be calculated and the products summed. However, other techniques can also be used that reduce the number of operations required to calculate the cross-correlation directly from the definition. For instance, various Fast Fourier Transform (FFT) algorithms can be adapted to calculate cross-correlation. Calculation of cross-correlation directly from the definition can use approximately $O(N^2)$ operations, where O denotes some upper bound on the number of operations, and N is a sequence length. Some FFT algorithms, on the other hand, can reduce the number of operations to $O(N \log_2 N)$. For large N, decimation-in-time or decimation-in-frequency FFT algorithms, for example, can significantly reduce the number of operations required to calculate cross-correlation or other values such as autocorrelation or the Discrete Fourier Transform. Additional techniques that reduce the number of computer operations required to calculate cross-correlation and other such values are described further below.

Turning now to FIGS. 1A-1C, one example of determining cross-correlation values between two sequences x 102 and y 104 is shown. As with the example sequences f and g above, x 102 and y 104 can include a plurality of values that represent signals such as image data or audio data. In some implementations, the values may be samples that represent the level or magnitude of a signal that has been sampled at regular intervals. For example, an analog audio signal may be sampled at a sampling frequency of 32 kHz. Accordingly, each value of one of the sequences x or y that represents the sampled audio signal may indicate a quantized level of the audio signal at a particular sampling time, and adjacent values in the sequence may represent a quantized level of the audio signal at another sampling time separated by the sampling period (0.00003125 seconds for 32 kHz sampling).

The example sequences x 102 and y 104 are binary sequences. That is, each of the values in the sequences is selected from a set of just two values. Here, the values are selected from the binary set {0, 1}. Binary sequences include values with relatively low resolution, but can be useful to efficiently perform signal processing operations, such as cross-correlation calculations, in circumstances where high resolution is not necessary. For example, using binary sequences, a digital value can be represented by just one data bit. Thus, an 8-bit byte can include 8 different sample values, and a 32-bit integer can include 32 different sample values. Advantages of binary sequences thus include minimized data storage requirements and the ability to perform bitwise binary operations in signal processing algorithms. Additionally, binary sequences have an advantage in that a calculated cross-correlation value is not dependent upon the scale of the sequences. Since the cross-correlation value is not dependent upon the scale of the sequences, a fixed threshold may be used to determine whether the level of a signal satisfies (e.g., exceeds) the fixed threshold level. In contrast, performing cross-correlation on non-binary sequences typically requires normalization of the cross-correlation values if the calculated cross-correlation values are to be compared to a fixed threshold.

In some implementations, the binary sequences x 102 and y 104 may be generated using 1-bit digital quantization. Each time a signal represented by the sequences is sampled and the level of the signal satisfies (e.g., exceeds) a pre-defined threshold level, a first one of the binary values is selected to represent the level of the signal at that time. The other one of the binary values can be selected to represent the level of the signal for samples where the level does not satisfy (e.g., does not exceed) the pre-defined threshold level. For example, the binary value 0 can be a 1-bit quantization of a signal sample that does not satisfy the threshold, and the binary value 1 can be the 1-bit quantization of a signal sample that does satisfy the threshold.

In some implementations, binary sequences can be derived from non-binary sequences whose values may represent 3 or more different signal levels. For example, using 16-bit quantization, a signal may be sampled with much finer resolution so that each analog signal value can be represented by one of 65,536 unique signal levels. In certain signal processing applications, it may be desirable to convert non-binary sequences to binary sequences. In one implementation, each value in a non-binary sequence can be compared to a pre-defined threshold value, and a non-binary value that satisfies the threshold is assigned a first binary value (e.g., 1), whereas each non-binary value that does not satisfy the threshold is assigned a second binary value (e.g., 0).

Figure 4:
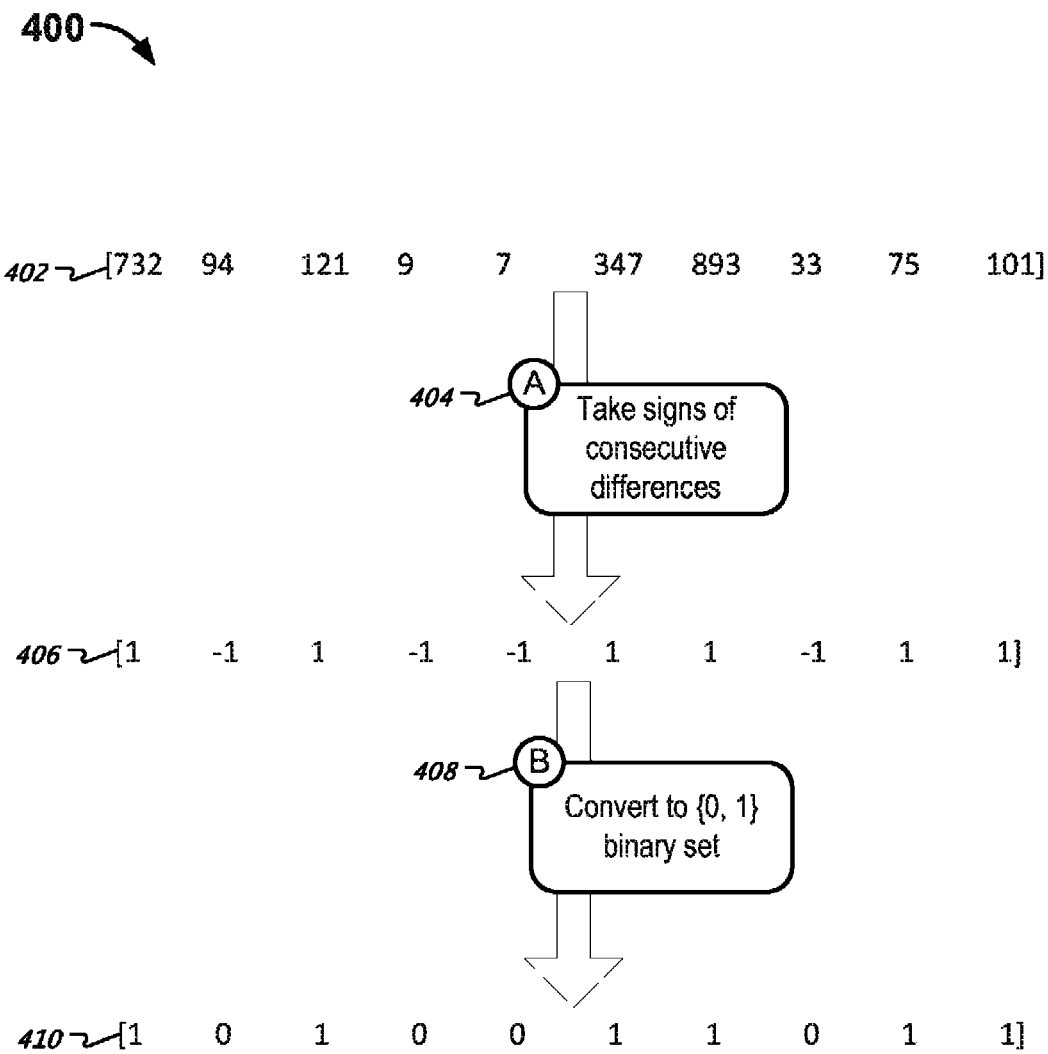
FIG. 4 is a conceptual diagram of a process for generating a binary vector from a non-binary vector.

With reference to FIG. 4, another example of a process 400 for converting a non-binary sequence to a binary sequence is shown. In this example, unlike some other binary sequences, the binary values do not indicate the value of a signal relative to a threshold value. Instead, the binary values in FIG. 4 represent signs of differences between consecutive non-binary values in a sequence. For instance, non-binary vector 402 includes a plurality of sequence values—e.g., 732, 94, 121, 9, 7, and so on.

At stage A (404), an intermediate binary sequence 406 is generated by evaluating differences between consecutive values in the non-binary vector 402. For each or a portion of the values in non-binary vector 402, if the value that follows a particular value is greater than the particular value, then a first binary value is selected as corresponding to the particular value. If the value that follows a particular value is less than the particular value, then a different, second value is selected as corresponding to the particular value. If a pair of consecutive values is equal, then either the first or second binary value can be selected for a particular value. For example, it has been shown that binary values in the set {−1, 1} can be used effectively in a binary sequence that has been converted from a non-binary sequence according to the techniques shown in FIG. 4. Pairs of consecutive values in a non-binary sequence can be represented by the value 1 if the values in the pair increase from the first value to the second, subsequent value in the pair. On the other hand, pairs of consecutive values in a non-binary sequence can be represented by the value −1 if the values in the pair decrease from the first value to the second, subsequent value in the pair. For example, the consecutive pair of values 732, 94 from non-binary vector 402 is a decreasing pair, represented by −1 in the intermediate binary vector (sequence) 406. The consecutive pair of values 94, 121 from non-binary vector 402 can then be represented by the binary value 1 in the intermediate binary vector 406. This process can continue for all or some of the pairs of values in the non-binary vector 402. In some implementations, for a non-binary vector of length N, the value of vector location k in the intermediate binary vector 406 can represent the increasing or decreasing nature of the pair of values in vector locations k and k−1 from non-binary vector 402. In some implementations, the first value of the intermediate binary vector 406 at vector location 0 can be arbitrarily determined. For example, the first value in intermediate binary vector 406 is arbitrarily selected to be 1.

At operation B (408), the intermediate binary vector 406 can be converted to a second binary vector 410. The second binary vector 410 includes binary values in the set {0, 1}. The second binary vector 410 can be generated from the intermediate binary vector 406 by mapping each instance of a −1 value in the intermediate binary vector 406 to a 0 value in the second binary vector 410. The 1s in the intermediate binary vector 406 are unchanged and remain as 1s in the second binary vector 410, whereas the −1s in the intermediate binary vector 406 are changed to 0s in the second binary vector 410. For example, intermediate binary vector 406 is changed from [1 −1 1 −1 −1 1 1 −1 1 1] to second binary vector 410, [1 0 1 0 0 1 1 0 1 1]. The second binary vector 410 having values in the set {0, 1} can be particularly useful for performing certain signal processing operations using available computer processor operations, such as XOR operations. In some implementations, the second binary vector 410 can be determined directly from the non-binary vector 402 without determining intermediate binary vector 406. For example, given a pair of consecutive values in which the second value in the pair decreases relative to the first value, the second binary vector 410 can be generated by selecting a 0 value for the pair rather than −1.

Figures 2A, 2B, 2C:
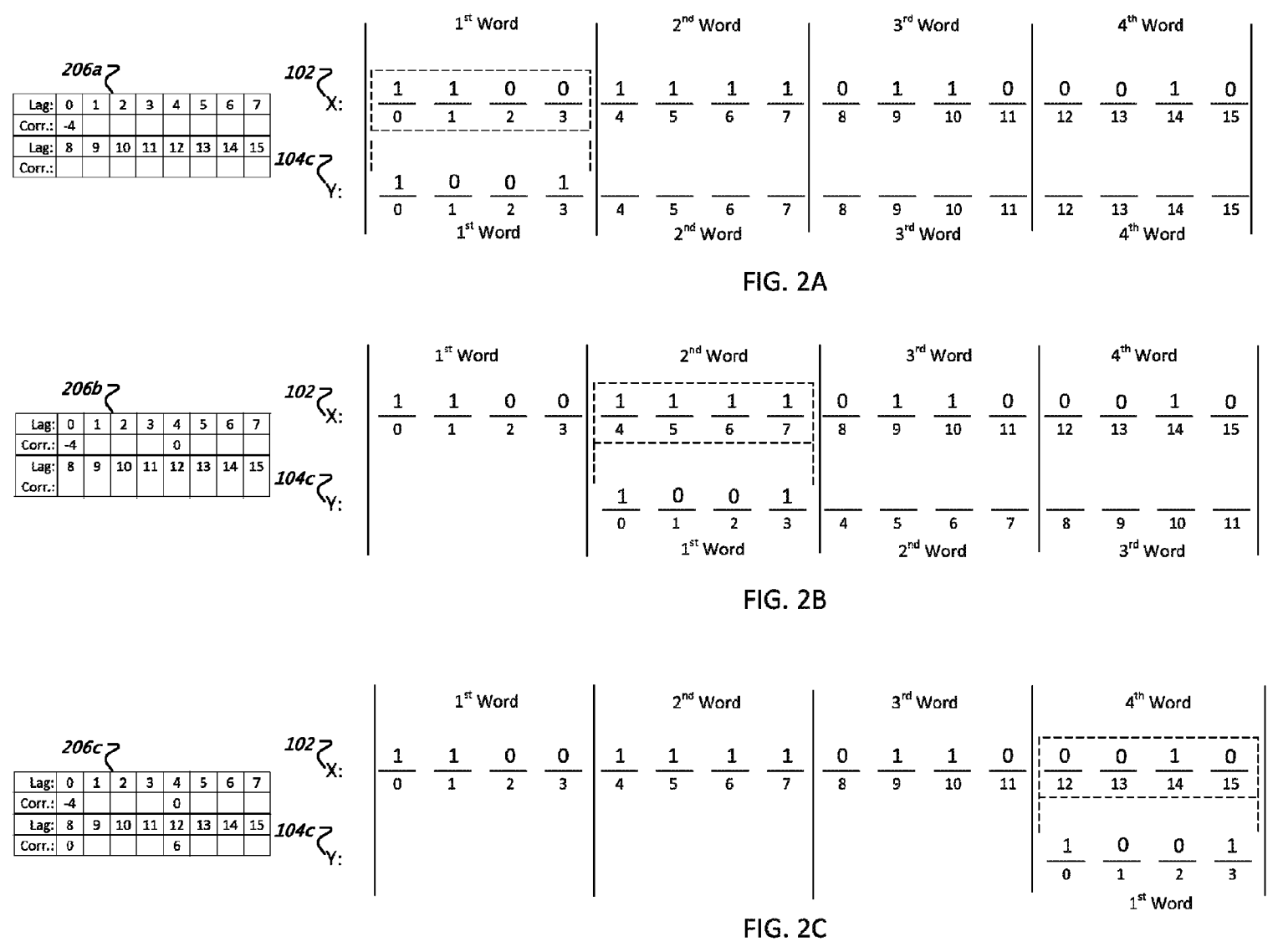

Turning again to FIGS. 1A-1C, binary vector x 102 and binary vector y 104a are shown as being segmented into one or more words. The values in binary sequence x are segmented into four words, each word consisting of four sequence values (i.e., word length n=4). Binary sequence y 104a is shorter than binary sequence x 102 and includes just four values. All four values of binary sequence y 104a are contained within a single word. In some implementations, binary sequences can be segmented into words according to the size of a data type in which the binary sequences are stored in computer memory and/or the width of data units that are loaded into a computer processor when operations are to be performed upon the data units. For example, a word may be 8-bits wide, such as a byte, so as to hold up to 8 binary values of a vector in each word. Words of other sizes may also be used, such as 32-bit integers that can hold up to 8 binary vector values in each word so that a binary sequence would be segmented into words of 32 bits. In some implementations, binary sequences can be segmented into words of a length that matches a length of data units that can be loaded into a processor for performance of one or more operations. In some implementations, the word length may be processor-specific or otherwise computer-specific. For example, processors that are configured to operate on longer word lengths may segment binary sequences into fewer words of longer length, whereas processors that are configured to operate on shorter word lengths may segment binary sequences into more words of shorter length. In the examples shown in FIGS. 1A-1C, as well as the examples in FIGS. 2A-2F and 3A-3F, the binary vectors x 102 and y 104 are segmented into words of length four. Each word in these examples can hold binary values for up to four different vector locations. In some implementations, the length of the vectors may not be a multiple of the word length n. For example, the word length n may be 8, while a particular vector may be 23 bits long. The 23-bit vector may thus have two words of length 8 and a third word of length 7. The techniques described herein can still be applied with the non-standard length of the third word, for example.

In some implementations, the length of a vector may exceed the length of a word, and the vector may therefore span multiple words. For example, binary vector x 102 is 16-bits long and therefore spans at least four 4-bit words. If binary vector x 102 was right-shifted between one and three vector locations, the binary values in the binary vector x 102 can spill into a fifth word.

In FIG. 1A, an example operation is shown for calculating a binary correlation score for vectors x 102 and y 104a at lag zero. The alignment of the vectors 102, 104a with respect to each other and the positions of the binary values within each of the vectors in this figure are provided so as to facilitate determination of the binary correlation at lag zero. For example, the values in each vector 102, 104a begin at the initial vector locations, $x_0$ and $y_0$, respectively, rather than being shifted to different vector positions. Moreover, the vectors are initially aligned such that corresponding vector locations in each vector 102 and 104a are aligned. For example, vector location $x_0$ aligns with vector location $y_0$, vector location $x_1$ aligns with vector location $y_1$, and so on. The result is that binary values are aligned between each vector in a designated zero lag correspondence. In some implementations, zero lag correspondence between values in the vectors may be achieved with other vector alignments and other positions of values in the vectors. However, for purposes of this example, zero lag is shown by aligning the vectors with no offset between corresponding vector locations and by positioning the vector values so that the first vector values begin at the first respective vector locations in each vector 102, 104a. It is shown in FIG. 1A that vector y 104a is shorter in length than vector x 102 in that vector y 104a is comprised of fewer values than vector x 102. The values in vector y 104a are assigned vector locations zero through three. In some implementations, the additional vector locations four through fifteen are simply conceptual, but may not be a part of the vector 104a in practice. For example, the vector y 104a may be stored as just four binary vector values in a single word. The other vector locations may or may not be reserved, but can be available, for example, as values are shifted in the vector y 104a.

A binary correlation score can be calculated for the vectors x 102 and y 104a at lag zero. In some implementations, such as where the binary values represent 1-bit quantizations of a sampled signal, the binary correlation score can be determined based on the definition of the cross-correlation between two discrete time sequences. For example, for each of the aligned value pairs between vectors x 102 and y 104a, the values in the pair can be multiplied to generate a product for the pair, and then the products of each of the aligned value pairs can be summed to determine the binary correlation score of the vectors at the particular lag position. The binary correlation score of the vectors x 102 and y 104a at lag zero can be determined by calculating the product of the respective values from paired vector locations $x_0 y_0$, $x_1 y_1$, $x_2 y_2$, and $x_0 y_0$. The products of these aligned value pairs are 1, 0, 0, and 0, respectively. The sum of the products yields the binary correlation score of 1 for lag zero (not shown in correlation score table 106a, which includes binary correlation scores determined using a different technique that can be applied when the binary values in the vectors represent increases or decreases among consecutive values in a non-binary vector).

Because vector y 104a is shorter than vector x 102, only a portion of all the values in vector x 102 are aligned with a value from vector y 104a. For example, the values in vector locations $x_4$ through $x_{15}$ are not aligned with a corresponding value from vector y 104a. In some implementations, the values in a first vector that are not aligned with values from a second vector may be deemed to be aligned with the value 0 such that the product of the non-aligned values with 0 is 0, thereby adding nothing to the overall binary correlation score for a given lag position. Therefore, in some implementations, to reduce the number of operations required to generate a binary correlation score, only aligned value pairs that include values from each vector may be calculated before the sum of products is calculated, while non-aligned values may be ignored. For example, as shown in FIG. 1A, only the first four values in vector x 102 are aligned with a value from vector y 104a. As such, products of only the four aligned value pairs may be determined, while the other 12 non-aligned values in vector x 102 may be ignored.

In some implementations, binary correlation scores can be determined using XOR operations. XOR operations can be used to determine the number of aligned value pairs that have differing binary values in the pair. In some implementations, where the binary values in the binary vectors x 102 and y 104a are representative of whether pairs of consecutive non-binary sample values for quantized signals are increasing or decreasing, the number of aligned value pairs that have different binary values can be used to determine a cross-correlation score of vectors at particular time lag values. For instance, the cross-correlation can be determined in some implementations by subtracting, from the lag value, two times the number of aligned value pairs that have differing binary values in the pair. For example, the number of aligned value pairs having different binary values at lag zero is 2 (vector location pairs $x_1y_1$ and $x_3y_3$). At lag value 0, the binary correlation score is num_lags−2*num_pairs_differing_bits=0−2*2=−4.

The XOR operation is an efficient mechanism for computing the number of aligned value pairs that are comprised of different binary values. For example, an arithmetic logic unit ("ALU") on a computer processor that implements the correlation techniques described herein may perform XOR operations on a pair of words in just one clock cycle in some implementations. In some implementations, one or more segmented words from one of the vectors 102, 104a can be compared with one or more segmented words from the other of the vectors 102, 104a by providing the words to a processor and performing a bitwise XOR operation on the words. For instance, the first word from vector x 102 can be provided to a processor along with the first word of vector y 104a, and bitwise XOR operations can be performed on each of the aligned values in the words by executing a single XOR instruction. In another example, for a processor that is configured to perform operations on data of a length that is a multiple of the word lengths of the vectors, multiple words from each vector can be provided to the processor. For example, a processor that operates on 8-bit wide data may be provided with both the first and second 4-bit words of vectors x 102 and y 104a. Thus, the XOR operation can be performed on entire words, or entire groups of words (e.g., when using single instruction, multiple data (SIMD) instructions) at once and as a single operation.

The process of computing additional correlation scores at different lag values continues in FIGS. 1B and 1C. In some implementations, as shown in FIGS. 1B and 1C, additional correlation scores at different lag values are determined by shifting the position of binary values in one of the cross-correlated vectors to different vector locations within the vector by an amount corresponding to the lag value so that new aligned value pairs are created. A correlation score can then be determined for a different lag value using the new aligned value pairs. For example, in FIG. 1B, the values in the shorter vector y have been shifted right by one vector location from vector y 104a to generate a shifted vector y 104b to be used in the determination of a correlation score with vector x 102 at lag value 1. Thus, whereas the sequence of vector values 1, 0, 0, 1 had been positioned at vector locations $y_0$ through $y_3$ in the un-shifted vector y 104a in FIG. 1A, the shifted vector y 104b includes the same sequence of vector values 1, 0, 0, 1 at vector locations $y_1$ through $y_4$. The result of shifting values in vector y 104b is to create new alignments of values with vector x 102. Whereas the un-shifted vector y 104a included values 1, 0, 0, 1 aligned with values 1, 1, 0, 0 in vector x 102, the new shifted vector y 104b aligns its values 1, 0, 0, 1 with values 1, 0, 0, 1 in vector x 102.

Notably, in the implementation of FIG. 1B, even though binary values are shifted across vector locations to new positions within vector y 104b to produce new aligned value pairs, the vectors x 102 and y 104b are not re-aligned with respect to one another. That is to say, any offset that existed between corresponding vector locations (rather than vector values) in vectors x 102 and y 104 are unchanged. For example, both un-shifted vector y 104a from FIG. 1A and shifted vector y from FIG. 1B are aligned without any offset. In both FIGS. 1A and 1B, for example, location 0 in vector x 102 aligns with location 0 in un-shifted vector y 104a and shifted vector y 104b. Accordingly, the new aligned value pairs in FIG. 1B are produced as a result of shifting values within one of the vectors x or y without re-aligning the vectors x and y.

One effect of shifting values without re-aligning is that particular computer operations may be executed that may not be needed when re-aligning vectors without shifting. For example, generating shifted vector y 104b from un-shifted vector y 104a includes shifting binary values to new vector locations (shifting bits) within the first word, and carrying over a binary value across a word boundary from the first word to the second word. In some implementations, shifting values across word boundaries may include storing one or more binary values in a new word that was not previously used. For example, all four binary values in un-shifted vector y 104a are contained within a single word, but when the values are shifted to new vector locations and across a word boundary, two words are then used to hold shifted vector y 104b. By contrast, re-aligning vectors without shifting does not involve shifting vector values to new positions within a vector, and therefore does not involve shifting values within words or carrying values over to new words or across word boundaries.

The binary correlation score is then determined for lag value 1 between vector x 102 and vector y 104b. The binary correlation score can be determined using similar techniques to those that were used to determine the score at lag 0 in FIG. 1A. Bitwise operations can be performed with respect to each of the aligned value pairs. In some implementations, bitwise operations may be performed only where a vector value occupies a vector location in the shorter vector y 104b. For example, as shown in FIG. 1B, the four aligned value pairs from vector locations 1 through 4 may be evaluated. In implementations where the vectors x and y are binary vectors in which 0 and 1 values indicate a decrease or increase, respectively, from a first value to a second consecutive value in an original vector, the binary correlation score can be generated by performing an XOR operation on the aligned value pairs to determine a number of aligned value pairs having different bits, and then applying the correlation formula num_lags−2*num_pairs_differing_bits=1−2*0=1.

In some implementations, at least some of the operations for generating the binary correlation scores at different lag values can be executed upon providing one or more words to a processor. For example, at lag value 1, the four aligned value pairs in vectors x 102 and y 104b are positioned within only three of the four available vector locations of a first word, and one of the four available vector locations of a second word in each vector 102, 104b. In order to perform XOR operations on each of the aligned value pairs, the first word of vector x 102 and the first word of vector y 104b can be provided to a processor as the operands for a first XOR operation, and the second word of vector x 102 along with the second word of vector y 104b can be provided to the processor as operands for a second XOR operation (assuming that the vectors are segmented into words of the same length as units of data handled by the processor). The number of aligned value pairs comprised of different values can be determined by summing the results of the XOR operation. However, unlike the scenario depicted in FIG. 1A, at lag value 1, not all of the vector locations in the words provided to the processor include values from the vectors x 102 or y 104b. As indicated by the dashed lines in FIG. 1B, only the aligned value pairs in vector locations 1 through 4 need be evaluated. In some implementations, a processor may be configured to only evaluate the aligned value pairs in the words and not vector locations in the words for which both vectors do not include a value. In some implementations, unfilled vector locations that do not have a value can be assigned values in a manner that does not affect a result of the XOR operation. For instance, vector location $x_0$ holds binary value 1, and is arranged to be XORed with vector location $y_0$, which does not hold a binary value. Accordingly, vector location $y_0$ can be assigned the value 1—the same value as vector location $x_0$—so that the result of the XOR of the values in $x_0$ and $y_0$(1 and 1) is 0. Therefore, the sum of the bits resulting from the XOR operation will not be influenced in calculation of the binary correlation score. In some implementations, the results of an XOR operation can be masked so that only the XOR results of aligned value pairs are maintained. For example, executing an XOR on a first word having the series of values [1 0 1 0] and second word having the series of values [0 1 1 0] can generate the resulting word [1 1 0 0]. If we were only interested in retaining the middle two values (e.g., because only the middle two values correspond to aligned value pairs from a pair of binary sequences), then the resulting word [1 1 0 0] may be masked with the word [0 1 1 0] by performing a bitwise logical AND operation, so that the masked result is [0 1 0 0]. A binary correlation score may then be determined using the masked results.

FIG. 1C shows the calculation of a binary correlation score of vector location x 102 and y 104n at lag value 12. The correlation score table 106c shows the results of additional binary correlation scores that have been calculated at intermediate stages after the calculations depicted in FIG. 1B. The binary correlation scores from lag value 1 through lag value 12 may be determined by shifting the position of values in vector y 104n to different vector locations corresponding to particular lag values. In some implementations, all or some of the binary correlation scores between two sequences over a range of lag values can be determined by shifting values in one or the other, or both, sequences, without re-aligning vector locations between the sequences.

Turning to FIGS. 2A-2F, another example implementation is depicted for generating correlation scores at different lag values for binary sequences of different lengths. Many of the techniques, such as for generating correlation scores of the sequences at individual lag values, that are described above with reference to FIGS. 1A-1C may also apply in the example implementation of FIGS. 2A-2F. However, among other things, the manner in which the aligned value pairs are determined between sequences x 102 and y 104 is different in the example implementation of FIGS. 2A-2F than the example implementation of FIGS. 1A-1C. In some implementations, the example in FIGS. 2A-2F may provide advantages over the example of FIGS. 1A-1C in terms of reduced computational expense and faster, more efficient calculation of correlation scores.

Generally, FIGS. 2A-2F each show the calculation of a respective correlation score between binary vectors x 102 and y 104. The binary vectors x 102 and y 104 may each be comprised of a plurality of binary values from a respective binary sequence. The binary vectors x 102 and y 104 may be of different lengths and may be segmented into words of a uniform size that are configured to hold a particular number of binary values. The binary vectors x 102 and y 104 may be generated according to the process 300 of FIG. 3 in some implementations. For example, the values in binary vectors x 102 and y 104 may be derived from corresponding non-binary values of a sampled signal by taking the signs of differences of pairs of consecutive non-binary values in the sampled signal, and converting to a {0, 1} binary set. In the example of FIGS. 2A-2F, the binary vectors x 102 and y 104 each consist of the same sequence of binary values as in binary vectors x 102 and y 104 from FIGS. 1A-1C.

In the example implementation shown in FIGS. 2A-2F, correlation scores for the vectors x 102 and y 104 at different lag values can be determined while reducing the number of times that values are shifted to new positions within one of the vectors as compared to the approach in FIGS. 1A-1C. In some implementations consistent with the example of FIGS. 2A-2F, correlation scores for all lag values in which a binary value from one of the vectors x 102 and y 104 aligns with a binary value from the other of the vectors x 102 and y 104 can be determined by shifting binary values within one of the vectors 102, 104 only n−1 times, where n is the word length into which the vectors 102, 104 are segmented. By contrast, the example of FIGS. 1A-1C involved shifting values within one of the vectors 102, 104 at each lag value for which a correlation score was generated. Because shifting can require additional computer operations, and may be computationally expensive in certain implementations (e.g., automatic speech recognition) where low latency is desired, the minimized number of shifts in the example of FIGS. 2A-2F may achieve additional advantages over those in FIGS. 1A-1C.

The number of shifts required to calculate a plurality of correlation scores for different lag values can be minimized in some implementations by re-aligning a pair of vectors at particular lag values without shifting binary values within one of the vectors. In some implementations, binary values within a first vector can be shifted to each position within a series of n (word length) consecutive positions, and after each shift, the vectors can be re-aligned at a plurality of different positions without shifting so as to generate respective aligned value pairs for a plurality of lag values. Correlation scores can be determined at each of the different alignments between the vectors, and at each alignment for each shift. In some implementations, as shown in FIGS. 2A-2F, the vectors can be re-aligned along word boundaries so that once a shift has occurred, correlation scores can be generated, for example, by comparing words in the shifted vector with different words in the other vector to determine particular correlation scores. An example of these implementations is described in the following paragraphs with respect to FIGS. 2A-2F.

FIG. 2A shows a long vector x 102 in a first, initial alignment with respect to short vector y 104c for determination of a correlation score among the vectors at lag value 0. Alignment refers to the offset of vector locations among the vectors. In the first alignment, there is no offset between corresponding vector locations—i.e., vector location $x_0$ aligns with vector location $y_0$, vector location $x_1$ aligns with vector location $y_1$, and so on. The values in the vectors are also in a first, initial position. In this example, the first value of each vector 102, 104c is positioned in vector location 0. As a result of the position of values in each vector and the alignment between the vectors, aligned value pairs are created for values in each of the first four vector locations 0 through 3. A correlation score is then determined for lag value 0. In some implementations, aligned pairs of words from the respective vectors 102, 104c can be provided as operands to a processor for bitwise operations of the aligned value pairs in the words. For example, bitwise XOR operations can be performed with the aligned value pairs from the first word of vector x 102 and vector y 104c. As in FIGS. 1A-1C, a correlation score can then be determined using a result of the bitwise XOR that indicates a number of aligned value pairs which have different values in each pair (2 in FIG. 2A). The binary correlation score can be determined in some implementations using the formula num_lags−2*num_pairs_differing_bits. In the example of FIG. 2A, this formula evaluates to 0−2*2=−4. The correlation score of −4 for lag value 0 is recorded in correlation score table 206.

After a first correlation score has been determined, additional correlation scores for different lag values can be determined by re-aligning the vectors 102, 104c without shifting values in the vectors. For example, in FIG. 2B, the correlation score at lag value 4 is determined by re-aligning the vectors x 102 and y 104c with an offset of 4 vector locations such that vector location $x_4$ aligns with vector location $y_0$.

In some implementations, the vectors can be re-aligned so that the offset between vector locations is a multiple of the word length n of the vectors 102, 104c. For example, the words in FIGS. 2A-2F are of length 4, and the re-alignments in FIGS. 2A-2F are by multiples of 4 vector locations. By using a re-alignment amount that is a multiple of the word length n, a binary correlation score for every nth lag value can be determined without shifting the position of values in the vectors 102, 104c by comparing particular words in one of the vectors 102, 104c with different words in the other of the vectors 102, 104c based on the lag value. Thus, in some implementations, re-aligning the vectors 102, 104c can simply indicate which words from a first one of the vectors 102, 104c are to be compared (e.g., XORed) with a given set of words from a second one of the vectors 102, 104c. For example, in FIG. 2B, the correlation score at lag value 4 can be determined by comparing the first word of vector y 104c with the second word of vector x 102. The result of providing the second word of vector x 102 to a processor for a bitwise XOR operation with the first word of vector y 104c is that aligned value pairs are created that are equivalent to the aligned value pairs if the values in one of the vectors 102, 104c had been shifted from their positions shown in FIG. 2A by four vector locations. However, by re-aligning without shifting, the computational expense of achieving the same result is reduced, and the correlation score for lag 4 is determined to be 0. By contrast, in the example of FIGS. 1A-1C, determining the correlation score at lag 4 includes performing one or more shifting operations to move the values of vector y 104c to different vector locations from their starting positions.

FIG. 2C shows an example re-alignment of vectors x 102 and y 104c to calculate a correlation score of 6 at lag value 12. Here, vector x 102 is re-aligned with vector y 104c such that vector locations 12-15 in vector x 102 align with vector locations 0-3 in vector y 104c, respectively. In some implementations, the re-alignment can be achieved without shifting values in either vector x 102 or y 104c, and by comparing (e.g., performing a bitwise XOR) the first word of vector y 104c with the fourth word of vector x 102. Re-alignment and correlation score generation can proceed in this manner for all or some of the words in vector x 102. For example, if vector x 102 was 24 bits long, then the first word of vector y 104c could be re-aligned with the fifth and sixth words of vector x 102, respectively, to determine correlation scores at lag values 16 and 20, respectively.

Once correlation scores have been determined by re-aligning vector y 104c at the beginning of each word in vector x 102, the values in vectors 102, 104c can be shifted to new vector locations. For example, in FIG. 2D, the values in vector y 104c are shifted to generate shifted vector y 104d in which the sequence of values is moved from vector locations 0 through 3 to vector locations 1 through 4. The first word of vector y 104d is also re-aligned with the first word of vector x 102 so that aligned value pairs are created among the values in vector locations 1 through 4 in each of the vectors 102, 104d. A correlation score (e.g., 1) at lag value 1 can be determined based on the number of aligned value pairs that include different values from each vector 102, 104d. For example, the first and second words of vector y 104d can be provided to a processor for comparison (e.g., bitwise XOR) with the first and second words of vector x 102.

Figures 2D, 2E, 2F:
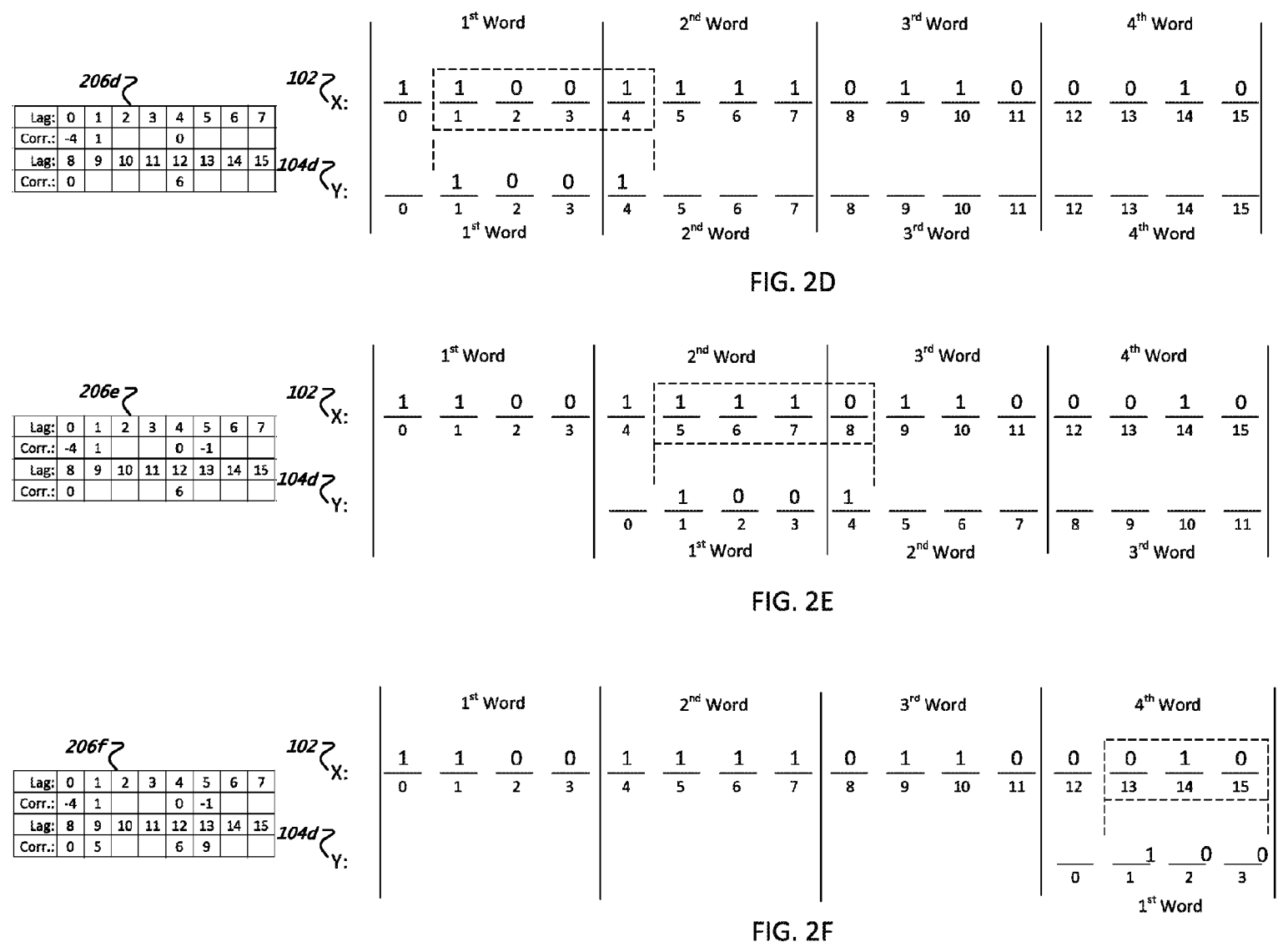

FIGS. 2E and 2F show examples of calculating additional correlation scores at each nth+1 lag value. For example, correlation scores at the 5th, 9th, and 13th lag values can be determined without any additional shifting of values in the vectors 102, 104d by re-aligning the first word of shifted vector y 104d with the second, third, and fourth words of vector x 102, respectively.

Additional correlation scores can be determined in like manner as described above with respect to FIGS. 2A-2F. For example, a new shifted vector y 104 may be generated by shifting the sequence of values to vector locations 2 through 5 in vector y 104. Vectors x 102 and the new shifted vector y can then be aligned at their word boundaries to generate correlation scores at lag values 2, 6, 10, and 14. In some implementations, the process of shifting and re-aligning the vectors at multiple locations can be repeated until a correlation score has been determined at every lag value. In some implementations a correlation score can be determined at every lag value by shifting values in a vector only n times (the word length), including a "shift" to the original position of values in the vector.

FIG. 3 is a flowchart of an example process 300 for determining a similarity of two vectors. In some implementations, the process 300 can minimize the number of shifts required to generate a respective correlation score for each of a plurality of lags between the vectors. The examples shown in FIGS. 2A-2F may be one implementation of the process 300.

The process 300 can begin at stage 302, in which a first vector and a second vector are obtained. The first vector and second vector can each be comprised of a respective sequence of values. The values may be designated by their respective vector location in the vectors. In some implementations, the values in the vectors may represent digital samples of respective signals. For example, one of the vectors may represent a first audio signal that is played by a device, and the other of the vectors may represent a second audio signal captured by a microphone of the device. In some implementations, the process 300 and the techniques described throughout this paper can be used to determine a similarity of the first audio signal and the second audio signal. The similarity of the signals may indicate if one of the signals is included in the other. For example, a high similarity may indicate that the second audio signal includes an echo or feedback from the first audio signal. For example, a device may have a text to speech capability that synthesizes and plays speech to a user. A user may be able to interrupt the synthesized speech (barge-in) by speaking an utterance to the device, such as a command for the device to perform some action. An input audio stream may be monitored and compared to the synthesized audio to determine when the user has interrupted the synthesized speech. A high similarity between the input audio stream and the synthesized audio may indicate that barge-in has not occurred. In some implementations, a high similarity may indicate that an echo of the synthesized audio is in the background of a user's utterance, which may then be filtered out, for example, before audio of the utterance is provided to a speech recognizer.

At stage 304, the process 300 generates a first binary vector and a second binary vector from the original vectors that were obtained in stage 302. In some implementations, the binary vectors can be generated by reducing the values in each of the vectors to a 1-bit quantization of the values in original vectors. For example, each of the values in the original vectors that satisfy a pre-defined threshold value may be mapped to binary 1, and each of the values in the original vectors that do not satisfy the pre-defined threshold value may be mapped to binary 0. In some implementations, the binary vectors can be generated by evaluating, as in process 400 of FIG. 4, whether each pair of consecutive values in the original vectors increases or decreases from the first to the second value in the pair. Values that increased can be mapped to binary 1, and values that decreased can be mapped to 0, or may be mapped to −1 and then converted to 0.

At stage 306, the process 300 segments the first and second binary vectors into words of length n. The word length n can correspond to a computer-specific or processor-specific length of a data unit. For example, the word length n may be an 8-bit byte, or a 32-bit integer. Each word in the segmented vectors may be stored and accessed by a particular memory address in some implementations. The bits in each word can be packed with binary values in each vector location of the word in some implementations.

At stage 308, the process 300 aligns a first word of the second binary vector with a first word of a first binary vector. In some implementations, the initial alignment of the first and second binary vectors corresponds to an alignment at lag value 0. The binary values of each vector can be located in initial positions in the vectors so that a plurality of aligned value pairs is generated between the vectors. The first and second vectors may be different lengths in some implementations, and the number of aligned value pairs may equal the length of the shorter of the first and second vectors, for example.

At stage 310, the process 300 can generate a binary correlation score for the first and second binary vectors. The first binary correlation score generated may be at lag 0, but scores for other lag values may also be determined initially in some implementations. In some implementations, for example, where the values in the binary vector were mapped to binary values 0 and 1 based on whether consecutive pairs of values in the original vectors were decreasing or increasing, respectively, the binary correlation scores can be generated using a result of a bitwise XOR among the aligned value pairs. In some implementations, generating the binary correlation score can include comparing, by a processor, respective words from the first and second binary vectors that include binary values in aligned value pairs.

At stage 312, the process 300 can determine whether there are more words in the first binary vector that the second binary vector has not yet been re-aligned with initially or since a first shift of values in the second binary vector. If so, the process proceeds to stage 314, and re-aligns the first word of the second binary vector with the next word in the first binary vector. Re-alignment can generate new aligned value pairs for different lag values between the first and second binary vectors without shifting values to different vector locations in the vectors. A binary correlation score can then be determined at stage 310 for the re-aligned vectors. The cycle of re-alignment and binary correlation score generation can continue until the first word of the second binary vector has been re-aligned with all or a subset of all the words in the first binary vector.

At stage 316, the process 300 determines whether values in the second binary vector have previously been shifted to n unique vector locations. For example, the values in the second binary vector can be shifted such that a particular value that is initially in a first vector location in the first word of the second binary vector is shifted to each of the vector locations in the first word of the second binary vector. After each shift at stage 318 until the particular value has been shifted through all of the vector locations in the first word of the second binary vector, the process 300 can return to stage 308 and continue through stages 310, 312, and 314 to re-align the first word of the shifted second binary vector with each word of the first binary vector and generating a binary correlation score for the vectors after each re-alignment.

At stage 320, the process 300 determines a similarity of the first and second binary vectors based on the generated binary correlation scores. The binary correlation scores can indicate a cross-correlation of the first and second binary vectors at particular lags between the vectors. In some implementations, one or more lag values for which respective binary correlation scores can be identified that indicate the greatest or least similarity between the first and second binary vectors. In some implementations, the process 300 can determine whether one or more of the correlation scores satisfies a threshold value that indicates a threshold similarity for the binary vectors.

Figure 5:
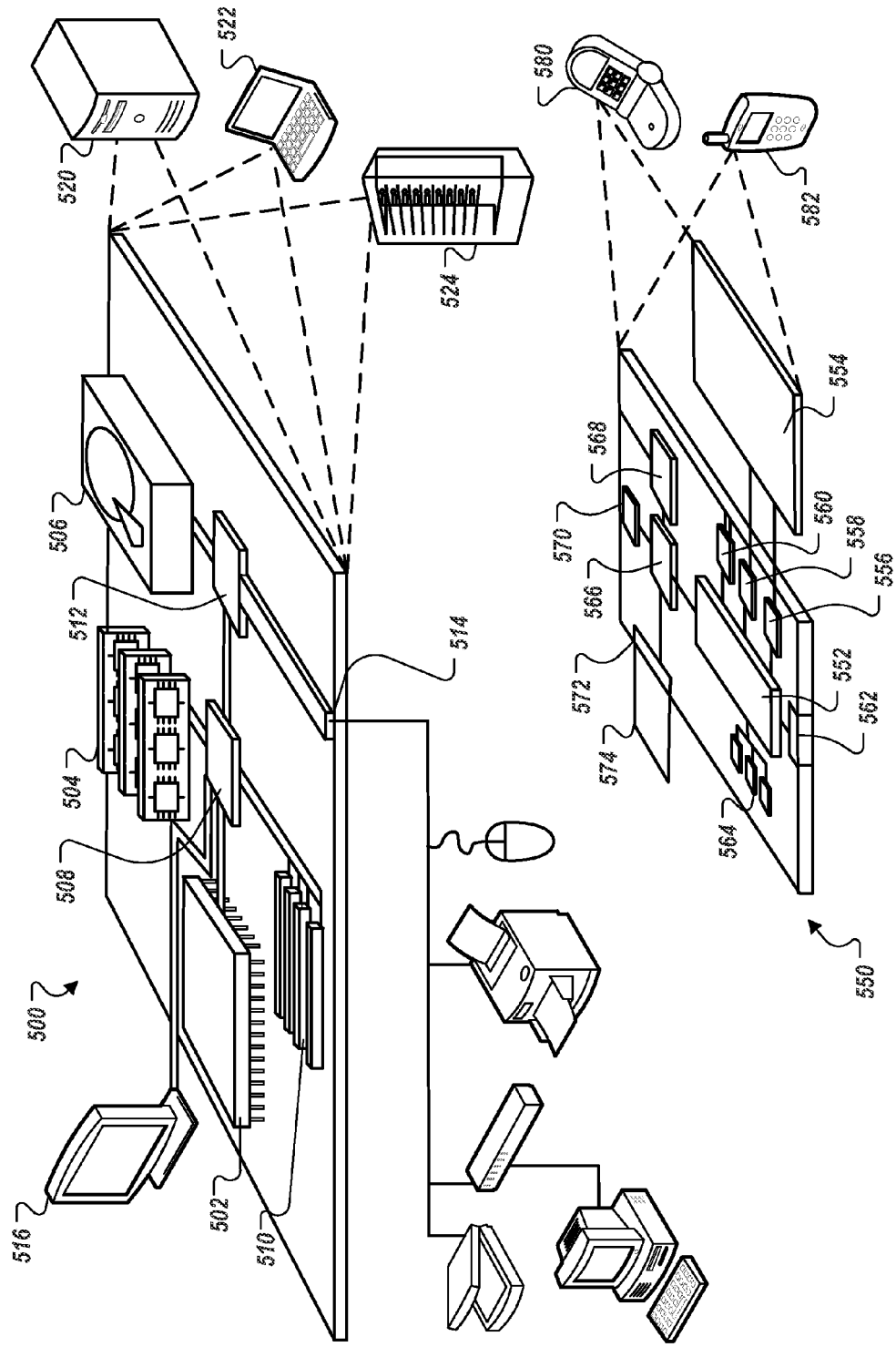
FIG. 5 depicts an example of a computing device and a mobile computing device that can be used to implement the techniques described herein.

FIG. 5 shows an example of a computing device 500 and a mobile computing device that can be used to implement the techniques described herein. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System)

receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for determining an echo of an audio signal, comprising:

receiving, by a computing system, a first audio signal and a second audio signal;

determining, by the computing system, a first binary vector that represents the first audio signal and a second binary vector that represents the second audio signal, the first binary vector being of length X and the second binary vector being of length Y, the first and second binary vectors each being segmented into words of length n, the first binary vector of length X being longer than the second binary vector of length Y, the first binary vector comprising respective binary values for a plurality of vector locations 0 through X−1, the second binary vector comprising respective binary values for a plurality of vector locations 0 through Y−1;

aligning, by the computing system, the second binary vector in a first position with respect to the first binary vector so that each of the binary values in the second binary vector aligns with a respective binary value in the first binary vector;

generating, by the computing system, a first binary correlation score for the first position of the second binary vector with respect to the first binary vector by (i) performing respective first binary operations between each binary value in the second binary vector in the first position and the aligned binary value in the first binary vector and (ii) combining results of the respective first binary operations according to a pre-defined correlation function;

aligning, by the computing system, the second binary vector in a second position with respect to the first binary vector, without shifting binary values of the second binary vector to different vector locations in the second binary vector, so that each of the binary values in the second binary vector aligns with a respective binary value in the first binary vector, the second position being offset by a multiple of n vector locations from the first position with respect to the first binary vector;

generating, by the computing system, a second binary correlation score for the second position of the second binary vector with respect to the first binary vector by (i) performing respective second binary operations between each binary value in the second binary vector in the second position and the aligned binary value in the first binary vector and (ii) combining results of the respective second binary operations according to the pre-defined correlation function; and determining, by the computing system and based on at least one of the first binary correlation score or the second binary correlation score, whether the first audio signal represented by the first binary vector includes an echo of the second audio signal represented by the second binary vector.

2. The computer-implemented method of claim 1, wherein the second binary vector of length Y is a multiple of the word length n and each word in the second binary vector is filled with n binary values.

3. The computer-implemented method of claim 1, wherein:

aligning the second binary vector in the first position with respect to the first binary vector and generating the first binary correlation score for the first position of the second binary vector comprises aligning the second binary vector and generating the first binary correlation score without shifting binary values of the second binary vector to different vector locations in the second binary vector; and aligning the second binary vector in the second position with respect to the first binary vector and generating the second binary correlation score for the second position of the second binary vector comprises aligning the second binary vector and generating the second binary correlation score without shifting binary values of the second binary vector to different vector locations in the second binary vector.

4. The computer-implemented method of claim 1, wherein:

the first binary vector is segmented into j words of length n;

the second binary vector is segmented into k words of length n;

aligning the second binary vector in the first position with respect to the first binary vector comprises aligning a first of the k words in the second binary vector with a first of the j words in the first binary vector; and aligning the second binary vector in the second position with respect to the first binary vector comprises aligning the first of the k words in the second binary vector with a second of the j words in the first binary vector that is different than the first of the j words in the first binary vector.

5. The computer-implemented method of claim 4, further comprising, for each of a plurality of words selected from a group consisting of the j words in the first binary vector other than the first and second of the j words:

aligning the second binary vector in a particular position with respect to the first binary vector by aligning the first of the k words in the second binary vector with the respective word among the plurality of words in the first binary vector; and generating a third binary correlation score for the particular position of the second binary vector with respect to the first binary vector, including performing respective third binary operations between each binary value in the second binary vector in the particular position and the aligned binary value in the first binary vector.

6. The computer-implemented method of claim 5, wherein the plurality of words selected from the group consisting of the j words in the first binary vector other than the first and second of the j words comprises all j−2 words in the first binary vector other than the first and second of the j words.

7. The computer-implemented method of claim 1, further comprising:

shifting the binary values of the second binary vector by one vector location to generate a first shifted second binary vector in which binary values in the first shifted second binary vector are offset from corresponding binary values in the second binary vector by one vector location; and for each of at least some of the words in the first binary vector, aligning a first word of the first shifted second binary vector with the word in the first binary vector and generating a third binary correlation score by (i) performing respective third binary operations between each binary value in the first shifted second binary vector and a respective aligned binary value in the first binary vector and (ii) combining results of the respective third binary operations according to the pre-defined correlation function.

8. The computer-implemented method of claim 7, further comprising:

generating n−2 additional shifted second binary vectors in which, for each m from 2 through n−1, an mth one of the additional shifted second binary vectors has respective binary values that are offset from corresponding binary values in the second binary vector by m vector locations; and generating binary correlation scores using the additional shifted second binary vectors by aligning each of the additional shifted second binary vectors in one or more positions with respect to the first binary vector and generating a respective binary correlation score.

9. The computer-implemented method of claim 1, further comprising:

shifting the binary values of the first binary vector by a first number of vector locations to generate a first shifted first binary vector in which binary values in the first shifted first binary vector are offset from corresponding binary values in the first binary vector by the first number of vector locations; and for each of at least some of the words in the first shifted first binary vector, aligning a first word of the second binary vector with the word in the first shifted first binary vector and generating a third binary correlation score by (i) performing respective third binary operations between each binary value in the second binary vector and an aligned binary value in the first shifted first binary vector and (ii) combining results of the respective third binary operations according to the pre-defined correlation function.

10. The computer-implemented method of claim 1, further comprising shifting the binary values of the first binary vector by one vector location at a time for a total of n−1 times, and generating, after each shift of the first binary vector, one or more binary correlation scores based on the shifted first binary vector and the second binary vector.

11. The computer-implemented method of claim 1, further comprising determining a cross-correlation of the first binary vector and the second binary vector based on one or more of the binary correlation scores.

12. The computer-implemented method of claim 11, wherein determining whether the first binary vector is similar to the second binary vector comprises determining whether a value of the cross-correlation of the first binary vector and the second binary vector satisfies a threshold cross-correlation value.

13. The computer-implemented method of claim 1, wherein the binary values in the first binary vector and the second binary vector each represent changes among consecutive digitized samples in one or more sets of data, wherein the first binary vector and the second binary vector each comprises binary values consisting of 0 and 1, wherein a binary value of 1 indicates an increase from a first sample value to a next sample value in the one or more sets of data, wherein a binary value of 0 indicates a decrease from a first sample value to a next sample value in the one or more sets of data.

14. The computer-implemented method of claim 1, wherein:
 the first binary vector and the second binary vector each comprises binary values consisting of 0 and 1; and
 performing respective first or second binary operations to generate a third binary correlation score for the first position or the second position of the second binary vector with respect to the first binary vector comprises performing an XOR operation between each binary value in the second binary vector in the first or second position, respectively, and the aligned binary value in the first binary vector.

15. The computer implemented method of claim 1, wherein generating the first binary correlation score for the first position of the second binary vector with respect to the first binary vector comprises (i) performing respective XOR operations between each binary value in the second binary vector in the first position and the aligned binary value in the first binary vector and (ii) determining a sum of values resulting from the respective XOR operations as the first binary correlation score.

16. The computer-implemented method of claim 1, wherein generating the first binary correlation score for the first position of the second binary vector with respect to the first binary vector comprises (i) performing respective XOR operations between each binary value in the second binary vector in the first position and the aligned binary value in the first binary vector, (ii) determining a sum of values resulting from the respective XOR operations, and (iii) computing the first binary correlation score based on a lag value of the second binary vector with respect to the first binary vector and the sum of values resulting from the respective XOR operations.

17. The computer-implemented method of claim 1, further comprising:
 in response to determining that the audio signal represented by the first binary vector includes the echo of the audio signal represented by the second binary vector, filtering the audio signal represented by the first binary vector to at least partially remove the echo of the audio signal represented by the second binary vector from the audio signal represented by the first binary vector.

18. One or more computer-readable storage devices having instructions stored thereon that, when executed by one or more processors, cause the one or more processors to perform operations for determining an echo of an audio signal, the operations comprising:
 receiving a first audio signal and a second audio signal;
 determining a first binary vector that represents the first audio signal and a second binary vector that represents the second audio signal, the first binary vector being of length X and the second binary vector being of length Y, the first and second binary vectors each being segmented into words of length n, the first binary vector of length X being longer than the second binary vector of length Y, the first binary vector comprising respective binary values for a plurality of vector locations 0 through X−1, the second binary vector comprising respective binary values for a plurality of vector locations 0 through Y−1;
 aligning the second binary vector in a first position with respect to the first binary vector so that each of the binary values in the second binary vector aligns with a respective binary value in the first binary vector;
 generating a first binary correlation score for the first position of the second binary vector with respect to the first binary vector by (i) performing respective first binary operations between each binary value in the second binary vector in the first position and the aligned binary value in the first binary vector and (ii) combining results of the respective first binary operations according to a pre-defined correlation function;
 aligning the second binary vector in a second position with respect to the first binary vector, without shifting binary values of the second binary vector to different vector locations in the second binary vector, so that each of the binary values in the second binary vector aligns with a respective binary value in the first binary vector, the second position being offset by a multiple of n vector locations from the first position with respect to the first binary vector;
 generating a second binary correlation score for the second position of the second binary vector with respect to the first binary vector by (i) performing respective second binary operations between each binary value in the second binary vector in the second position and the aligned binary value in the first binary vector and (ii) combining results of the respective second binary operations according to the pre-defined correlation function; and
 determining based on at least one of the first binary correlation score or the second binary correlation score, whether the first audio signal represented by the first binary vector includes an echo of the second audio signal represented by the second binary vector.

19. A system comprising:
one or more computer processors; and
one or more computer-readable storage devices having instructions stored thereon that, when executed by the one or more computer processors, cause the one or more computer processors to perform operations for determining an echo of an audio signal, the operations comprising:
receiving a first audio signal and a second audio signal;
determining a first binary vector that represents the first audio signal and a second binary vector that represents the second audio signal, the first binary vector being of length X and the second binary vector being of length Y, the first and second binary vectors each being segmented into words of length n, the first binary vector of length X being longer than the second binary vector of length Y, the first binary vector comprising respective binary values for a plurality of vector locations 0 through X−1, the second binary vector comprising respective binary values for a plurality of vector locations 0 through Y−1;
aligning the second binary vector in a first position with respect to the first binary vector so that each of the binary values in the second binary vector aligns with a respective binary value in the first binary vector;

generating a first binary correlation score for the first position of the second binary vector with respect to the first binary vector by (i) performing respective first binary operations between each binary value in the second binary vector in the first position and the aligned binary value in the first binary vector and (ii) combining results of the respective first binary operations according to a pre-defined correlation function;

aligning the second binary vector in a second position with respect to the first binary vector, without shifting binary values of the second binary vector to different vector locations in the second binary vector, so that each of the binary values in the second binary vector aligns with a respective binary value in the first binary vector, the second position being offset by a multiple of n vector locations from the first position with respect to the first binary vector;

generating a second binary correlation score for the second position of the second binary vector with respect to the first binary vector by (i) performing respective second binary operations between each binary value in the second binary vector in the second position and the aligned binary value in the first binary vector and (ii) combining results of the respective second binary operations according to the pre-defined correlation function; and determining based on at least one of the first binary correlation score or the second binary correlation score, whether the first audio signal represented by the first binary vector includes an echo of the second audio signal represented by the second binary vector.

\* \* \* \* \*